United States Patent
Petit et al.

(10) Patent No.: US 12,172,552 B2
(45) Date of Patent: Dec. 24, 2024

(54) SLIDE FOR SEAT

(71) Applicant: FAURECIA Sièges d'Automobile, Nanterre (FR)

(72) Inventors: Fabrice Petit, St Georges des Groseillers (FR); Guillaume Petot, Landisacq (FR); Wang Chen, Mondeville (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 392 days.

(21) Appl. No.: 17/488,378

(22) Filed: Sep. 29, 2021

(65) Prior Publication Data
US 2022/0097571 A1 Mar. 31, 2022

(30) Foreign Application Priority Data
Sep. 30, 2020 (FR) .................................. 20 10008

(51) Int. Cl.
*B60N 2/07* (2006.01)
*B60N 2/02* (2006.01)
*B60N 2/08* (2006.01)
*B60R 21/015* (2006.01)

(52) U.S. Cl.
CPC ......... *B60N 2/0272* (2023.08); *B60N 2/0276* (2013.01); *B60N 2/0715* (2013.01); *B60N 2/0881* (2013.01); *B60R 21/01554* (2014.10)

(58) Field of Classification Search
CPC ................ B60N 2/0272; B60N 2/0276; B60R 21/01554
USPC .......................... 296/65.13, 14; 248/429, 430
See application file for complete search history.

(56) References Cited

U.S. PATENT DOCUMENTS

| | | | |
|---|---|---|---|
| 6,053,529 A | 4/2000 | Frusti | |
| 6,767,029 B2 | 7/2004 | Jaudouin | |
| 7,511,479 B2* | 3/2009 | Schuler | B60R 2/0715 |
| | | | 324/207.2 |
| 8,398,044 B2* | 3/2013 | Christoffel | B60R 21/01554 |
| | | | 324/207.13 |
| 8,814,122 B2* | 8/2014 | Couasnon | B60N 2/0244 |
| | | | 324/207.13 |
| 10,889,209 B2 | 1/2021 | Duriez | |
| 2019/0077280 A1* | 3/2019 | Duriez | B60N 2/06 |

FOREIGN PATENT DOCUMENTS

| | | |
|---|---|---|
| EP | 1199211 A1 | 4/2002 |
| EP | 3456580 A1 | 3/2019 |

* cited by examiner

*Primary Examiner* — Dennis H Pedder
(74) *Attorney, Agent, or Firm* — Barnes & Thornburg LLP

(57) ABSTRACT

A slide for a vehicle seat, comprising a female rail having at least one substantially planar wall, a male rail also having at least one substantially planar wall, mounted to slide relative to the female rail, the female rail surrounding the male rail with the substantially planar wall of the female rail facing the substantially planar wall of the male rail, and a position sensor integral with the substantially planar wall of the male rail and provided between the substantially planar wall of the male rail and the substantially planar wall of the female rail, protruding from the substantially planar wall of the male rail towards the substantially planar wall of the female rail.

8 Claims, 6 Drawing Sheets

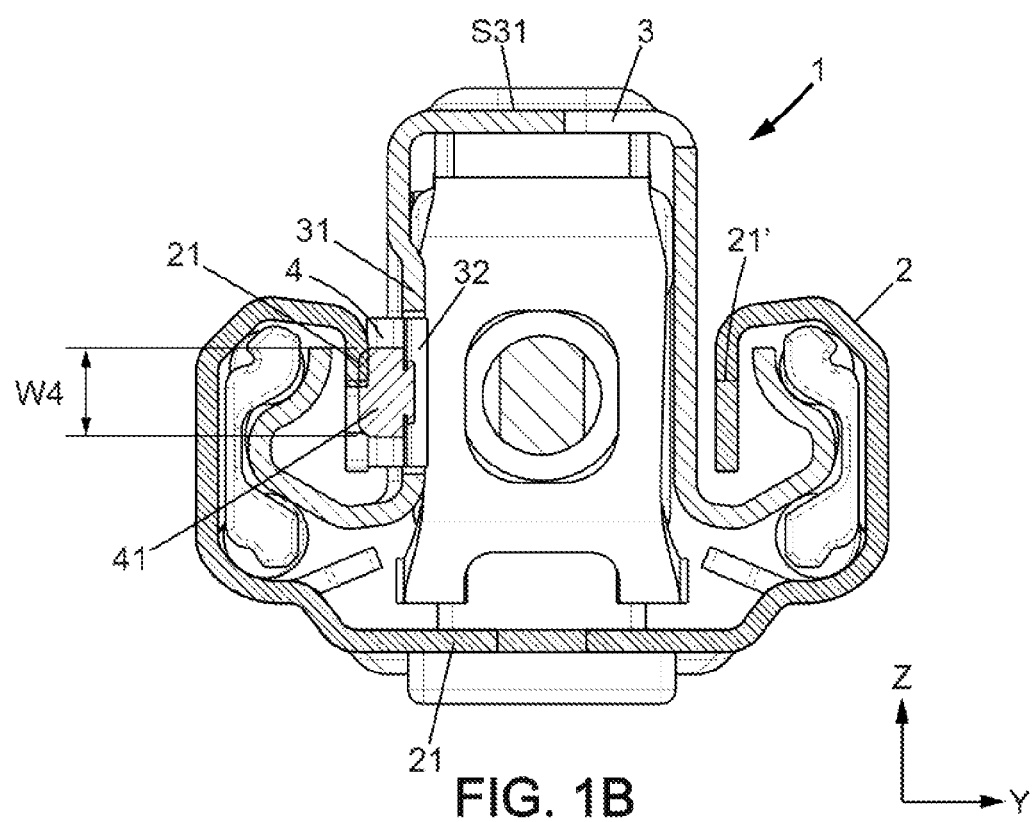

SLIDE FOR SEAT

PRIORITY CLAIM

This application claims priority to French Patent Application FR 20 10008, filed Sep. 30, 2020, which is expressly incorporated by reference herein.

BACKGROUND

The present disclosure relates to a slide, in particular for a motor vehicle seat, to an assembly comprising such a slide, and to a vehicle seat comprising such a slide or such an assembly.

More particularly, the present disclosure relates to a slide for a vehicle seat comprising a female rail and a male rail which are mounted to slide relative to each other in a longitudinal direction of the slide, the female rail surrounding the male rail in a transverse direction of the slide.

SUMMARY

According to the present disclosure, a slide for a vehicle seat comprises a female rail and a male rail which are mounted to slide relative to each other in a longitudinal direction of the slide, the female rail surrounding the male rail in a transverse direction of the slide, and with a position sensor configured to determine the position of the male rail relative to the female rail that is of simplified design and of reduced footprint and production cost.

In illustrative embodiments, a vehicle seat, comprises
a female rail having at least one substantially planar wall,
a male rail also having at least one substantially planar wall, mounted to slide relative to the female rail in the longitudinal direction of the slide, the female rail surrounding the male rail in the transverse direction of the slide, with the substantially planar wall of the female rail facing the substantially planar wall of the male rail,
a position sensor configured to determine the position of the male rail relative to the female rail, at least in the longitudinal direction of the slide.

In illustrative embodiments, the position sensor is integral with the substantially planar wall of the male rail and provided between the substantially planar wall of the male rail and the substantially planar wall of the female rail, protruding from the substantially planar wall of the male rail towards the substantially planar wall of the female rail.

In illustrative embodiments, the substantially planar wall of the female rail is a vertical side wall of the female rail, and the substantially planar wall of the male rail is a vertical side wall facing the vertical side wall of the female rail in the transverse direction of the slide, the position sensor being integral with the vertical side wall of the male rail and extending between the vertical side wall of the male rail and the vertical side wall of the female rail in the transverse direction of the slide, protruding from the vertical side wall of the male rail towards the vertical side wall of the female rail.

In illustrative embodiments, the substantially planar wall of the female rail has a through-opening extending over a first longitudinal portion of the female rail in the longitudinal direction of the slide, and configured so that the position sensor is located opposite the opening when the position sensor is located opposite the first longitudinal portion.

In illustrative embodiments, the female rail is delimited in the longitudinal direction of the slide by a first longitudinal end and a second longitudinal end, the first longitudinal portion of the female rail extending between the first longitudinal end and an intermediate point positioned between the first longitudinal end and the second longitudinal end in the longitudinal direction of the slide, a second longitudinal portion of the female rail extending between the intermediate point and the second longitudinal end in the longitudinal direction of the slide.

In illustrative embodiments, the vertical side wall of the female section piece is called the first vertical side wall, the female section piece comprising a second vertical side wall substantially parallel to the first vertical side wall, the first vertical side wall and the second vertical side wall surrounding the male section piece in the transverse direction of the slide.

In illustrative embodiments, the male rail is delimited in the longitudinal direction of the slide by a first longitudinal end and a second longitudinal end, the position sensor being fixed on the substantially planar wall of the male rail near the first longitudinal end or the second end longitudinal.

In illustrative embodiments, the position sensor comprises a means for measuring the surrounding magnetic field.

In illustrative embodiments, an assembly comprises
a slide according to the present disclosure,
a control unit to which the position sensor of the slide is connected,
a vehicle crash detection means,
a first retaining means for retaining a vehicle seat occupant, connected to the control unit, able to transition:
from a retracted position, in which the first retaining means is held inside a first housing, to
a deployed position, in which the first retaining means is deployed out of the first housing, at least partially,
a second retaining means for retaining a vehicle seat occupant, connected to the control unit, able to transition:
from a retracted position, in which the second retaining means is held inside a second housing, to
a deployed position, in which the second retaining means is deployed out of the second housing, at least partially.

In illustrative embodiments, the second retaining means in its deployed position has a volume strictly greater than that of the first retaining means in its deployed position, and the control unit is configured to:
control the transition of the first retaining means from its retracted position to its deployed position and the holding of the second retaining means in the retracted position, when the position sensor is located opposite the first longitudinal portion of the female rail, and when the detection means detects a crash of the vehicle,
control the transition of the second retaining means from its retracted position to its deployed position, when the position sensor is located opposite the second longitudinal portion of the female rail, and when the detection means detects a crash of the vehicle.

In illustrative embodiments, a vehicle seat comprises
a slide according to the present disclosure, and
a seating portion, the male section piece of the slide being connected to the seating portion of the seat, the seating portion having a central longitudinal axis passing substantially through the center of the seating portion in the transverse direction of the slide.

In illustrative embodiments, the first longitudinal end of the male rail is positioned at the front of the seat and the second longitudinal end is positioned at the rear of the seat in the longitudinal direction of the slide, and the position sensor is fixed on the substantially planar wall of the male rail near the second longitudinal end, the first longitudinal end of the female rail is positioned at the front of the seat and the second longitudinal end of the female rail is positioned at the rear of the seat in the longitudinal direction of the slide.

In illustrative embodiments, the first vertical side wall of the female rail is closer to the central longitudinal axis of the seating portion of the seat in the transverse direction of the slide than the second vertical side wall of the female rail.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1B is a section view of the slide of FIG. 1A along line I-I of FIG. 1A;

DETAILED DESCRIPTION

Figure 1A:
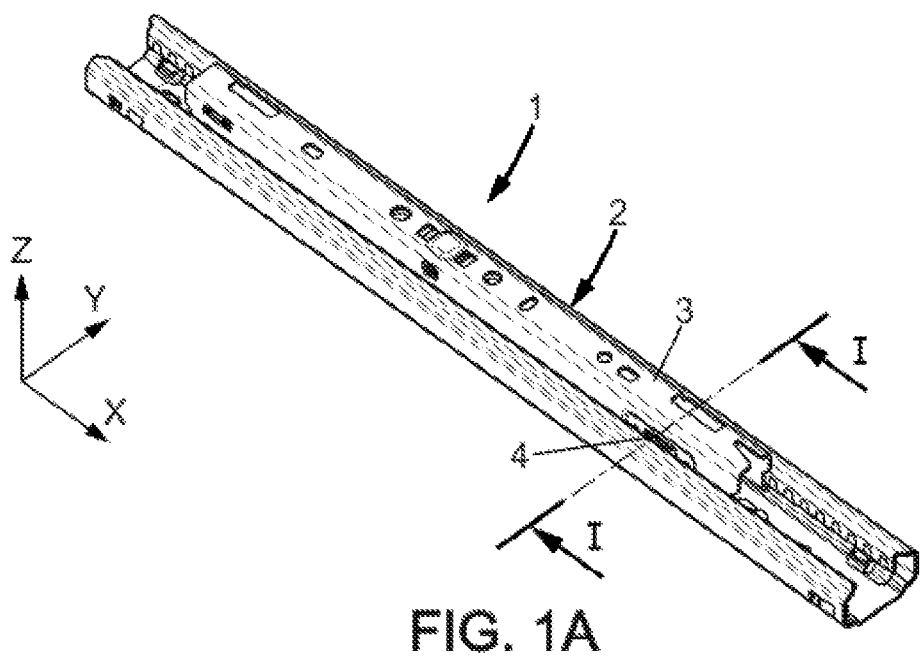
FIG. 1A is a perspective view of a slide according to one embodiment of the present disclosure.
Figure 2:
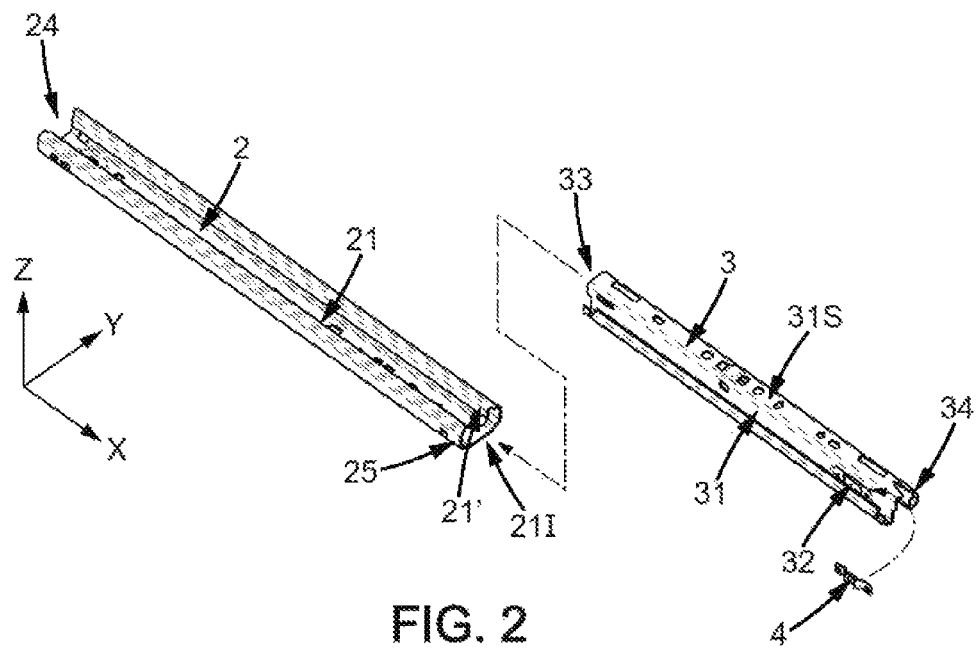
FIG. 2 is an exploded view of the slide of FIG. 1A.

Throughout this application:

the longitudinal direction X of the slide corresponds to the direction in which the male section piece slides relative to the female section piece, as can be seen in the figures, the vertical direction Z of the slide corresponds to the direction perpendicular to the longitudinal direction X, substantially perpendicular to the plane of the vehicle floor to which the slide is intended to be fixed, as can be seen in the figures, the transverse direction Y of the slide corresponds to the direction perpendicular to the longitudinal direction X and to the vertical direction Z of the slide, as can be seen in the figures, the longitudinal X, vertical Z, and transverse Y directions of the seat correspond to the longitudinal X, vertical Z, and transverse Y directions of the slide, as can be seen in the figures.

An axis is defined as a straight line in a determined direction of the slide or of the seat. For example, a longitudinal axis is an axis along the longitudinal direction X of the slide or of the seat.

Also, front and rear are understood relative to the longitudinal direction X of the slide, respectively of the seat, with an orientation for the seat that is from the rear edge of the seat, to which a backrest is generally hinged, towards the front edge of the seat.

Similarly, upper and lower are understood relative to the vertical direction Z of the slide, respectively of the seat, with an orientation that is from the slide section piece intended to be fixed to the vehicle floor towards the section piece intended to be fixed to the seating portion of the seat.

Finally, throughout this application, substantially longitudinal, transverse, or vertical is understood to mean an orientation that is at an angle of less than 30° relative to the longitudinal direction, the vertical direction, or the transverse direction, which can advantageously be zero.

Similarly, substantially parallel is understood to mean an orientation that is at an angle of less than 30° relative to a given element, which can advantageously be zero.

The present disclosure relates to a slide 1 for a vehicle seat, comprising:
- a female rail 2 having at least one substantially planar wall 21,
- a male rail 3 also having at least one substantially planar wall 31, mounted to slide relative to the female rail 2 in the longitudinal direction X of the slide 1, the female rail 2 surrounding the male rail 3 in the transverse direction Y of the slide 1, with the substantially planar wall 21 of the female rail 2 facing the substantially planar wall 31 of the male rail 3,
- a position sensor 4 configured to determine the position of the male rail 3 relative to the female rail 2, at least along the longitudinal direction X of the slide 1.

According to the present disclosure, the position sensor 4 is integral with the substantially planar wall 31 of the male rail 3 and provided between the substantially planar wall 31 of the male rail 3 and the substantially planar wall 21 of the female rail 2, protruding from the substantially planar wall 31 of the male rail 3 towards the substantially planar wall 21 of the female rail 2.

Thus, the position sensor 4 is entirely contained within the volume of the slide 1 between the male section piece 3 and the female section piece 2, as is particularly visible in FIGS. 1A and 1B.

As a result, the space occupied by the slide 1 according to the present disclosure is significantly reduced compared to comparative slides, because it does not include any element protruding outwardly from the male section piece 3 or from the female section piece 2, particularly for the position sensor 4, and this also simplifies its design and reduces its production cost.

In addition, as the position sensor 4 is arranged entirely within the volume of the slide 1, there is no risk of its being struck by an external element, such as a user's foot for example, and being damaged and therefore no longer serving to fulfill its function and in particular to provide for the safety of an occupant of a vehicle seat 10 fixed to the floor of a vehicle by means of the slide 1 according to the present disclosure.

The female rail 2 in fact can advantageously be fixed to the floor of a vehicle while the male rail 3 can be connected to a seat 10, and in particular to the seating portion 11 of a seat 10.

For this purpose, the male rail 3 can be positioned essentially above the female rail 2 in the vertical direction Z of the slide 1.

The female rail 2 can advantageously be made essentially of a metal material.

The slide 1 can be arranged so that the movement of the male rail 3 relative to the female rail 2 in the longitudinal direction X of the slide 1 is driven manually and/or by means of a driving means.

The position sensor 4 may comprise a means for measuring the surrounding magnetic field 41, as can be seen in FIGS. 1B, 3, and 5A to 5C, configured so that the magnetic field or its variation measured by the means for measuring the magnetic field 41 makes it possible to determine the position of the male rail 3 relative to the female rail 2 in the longitudinal direction X of the slide 1.

Additionally or alternatively, the position sensor 4 may include a mechanical switch, configured to be respectively open or closed depending on the position of the male rail 3 relative to the female rail 2 along the longitudinal direction X of the slide 1, by being actuated by the substantially planar wall 21 of the female rail 2, or else an optical switch, configured to be respectively open or closed depending on the position of the male rail 3 relative to the female rail 2 along the longitudinal direction X of the slide 1, by emitting an optical signal intended to be reflected or not reflected by the substantially planar wall 21 of the female rail 2.

According to one embodiment:
the substantially planar wall 21 of the female rail 2 is a vertical side wall 21 of the female rail 2,
the substantially planar wall 31 of the male rail 3 is a vertical side wall 31, facing the vertical side wall 21 of the female rail 2 in the transverse direction Y of the slide 1.

The position sensor 4 can then be integral with the vertical side wall 31 of the male rail 3 and extend between the vertical side wall 31 of the male rail 3 and the vertical side wall 21 of the female rail 2 in the transverse direction Y of the slide 1, protruding from the vertical side wall 31 of the male rail 3 towards the vertical side wall 21 of the female rail 2.

As can be seen in FIGS. 1A, 1B, 2, 3, 4, and 5A to 5C, the vertical side wall 21 of the female rail 2 can extend substantially in the longitudinal direction X and in the vertical direction Z of the slide 1. Similarly, the side wall 31 of the male rail 3 can also extend substantially in the longitudinal direction X and in the vertical direction Z of the slide 1.

Positioning the position sensor 4 on the vertical side wall 31 of the male rail 3 is particularly advantageous, in that such a wall 31 is generally closest to the vertical side wall 21 of the female rail 2. As a result, the position sensor 4 is as close as possible to the vertical side wall 21 of the female rail 2, and in particular can easily measure the magnetic field or its variation in the vicinity of the vertical side wall 21 of the female rail 2 when it comprises a means for measuring the magnetic field 41 or, when it comprises a mechanical switch, can allow direct actuation of the latter by the vertical side wall 21 of the female rail 2, or, when it comprises an optical switch, can receive or not receive an optical signal intended to be reflected by the vertical side wall 21 of the female rail 2, all this with no risk of an interfering element becoming lodged between the vertical side wall 31 of the male rail 3 and the vertical side wall 21 of the female rail 2. In addition, this also makes it possible to use a position sensor 4 of reduced dimensions, in order to limit the space occupied by the position sensor 4 and reduce the production cost of the slide 1.

Indeed, and without departing from the scope of the present disclosure, one could also envisage fixing the position sensor 4 on an upper horizontal wall S31 of the male rail 3, which can extend substantially in the longitudinal direction X and in the transverse direction Y of the slide 1, so that the position sensor 4 extends between the upper horizontal wall S31 of the male rail 3 and a lower horizontal wall I21 of the female rail 2, in the vertical direction Z of the slide 1, and is oriented towards the lower horizontal wall I21 of the female rail 2.

The lower horizontal wall I21 of the female rail 2 may also extend substantially in the longitudinal direction X and in the transverse direction Y of the slide 1.

Nevertheless, such an arrangement of the position sensor 4 may prove to be problematic, in that the lower horizontal wall I21 of the female rail 2 is generally provided for fixing to the floor of the vehicle receiving the slide 1, in order to ensure the attachment of the female rail 2 and therefore of the slide 1 to the floor, which can distort the measurements of the position sensor 4. Also, the distance between the upper horizontal wall 31S of the male rail 3 and the lower horizontal wall I21 of the female rail 2 can allow elements to come between them and therefore distort the measurements of the position sensor 4.

Figure 3:
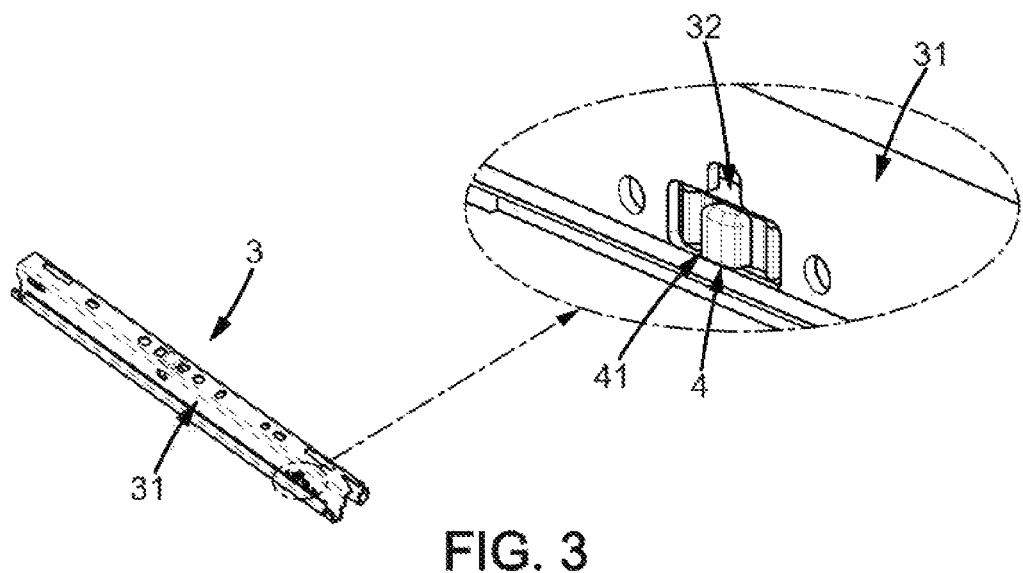
FIG. 3 is a perspective view of the male rail of the slide of FIG. 1A with a detailed view of the position sensor.

According to one embodiment and as can be seen in FIG. 3, the substantially planar wall 31 of the male rail 3 has a through-opening 32, at least partially receiving the position sensor 4 which protrudes towards the substantially planar wall 21 of the female rail 2 from the substantially planar wall 31 of the male rail 3.

This advantageous arrangement of the present disclosure facilitates the attachment of the position sensor 4 to the male rail 3, and in particular when the space between the substantially planar wall 31 of the male rail 3 and the substantially planar wall 21 of the female rail 2 is reduced, in particular when the substantially planar wall 31 of the male rail 3 is the vertical side wall 31 of male rail 3 and the substantially planar wall 21 of the female rail 2 is the vertical side wall 21 of the female rail 2.

The through-opening 32 can have a shape substantially corresponding to the shape of the means for measuring the magnetic field 41.

According to one embodiment, the substantially planar wall 21 of the female rail 2 has a through-opening O22 extending over a first longitudinal portion 22 of the female rail 2 in the longitudinal direction X of the slide 1, and configured so that the position sensor 4 is opposite the opening O22 when the position sensor 4 is opposite the first longitudinal portion 22.

Figure 4:
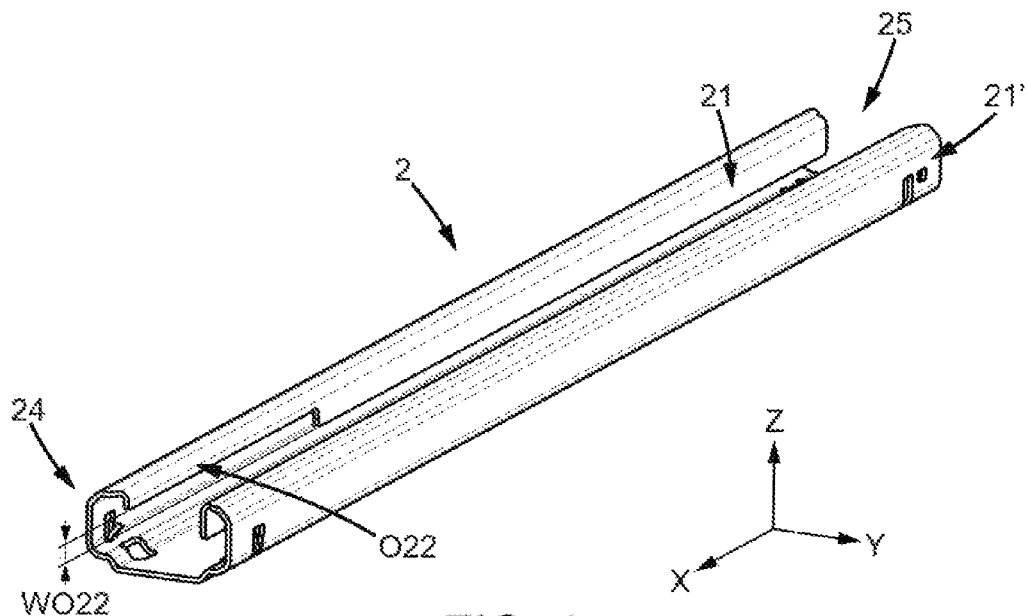
FIG. 4 is a perspective view of the female rail of the slide of FIG. 1A.

As can be seen in FIGS. 1B and 4, the through-opening O22 can have a width WO22 substantially equal to the width W4 of the position sensor 4. The width WO22 of the through-opening O22 can also be strictly greater than the width W4 of the position sensor 4.

Figure 5A:
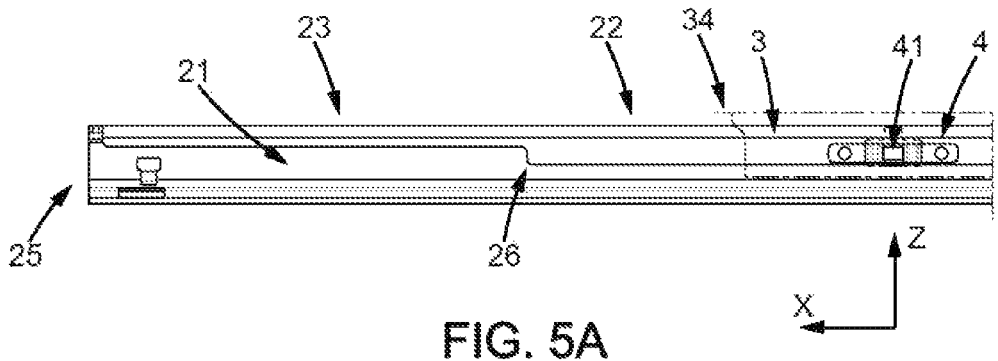
FIG. 5A is a side view of the slide of FIG. 1A, with the male rail in a first position relative to the female rail along the longitudinal direction of the slide.
Figure 5B:
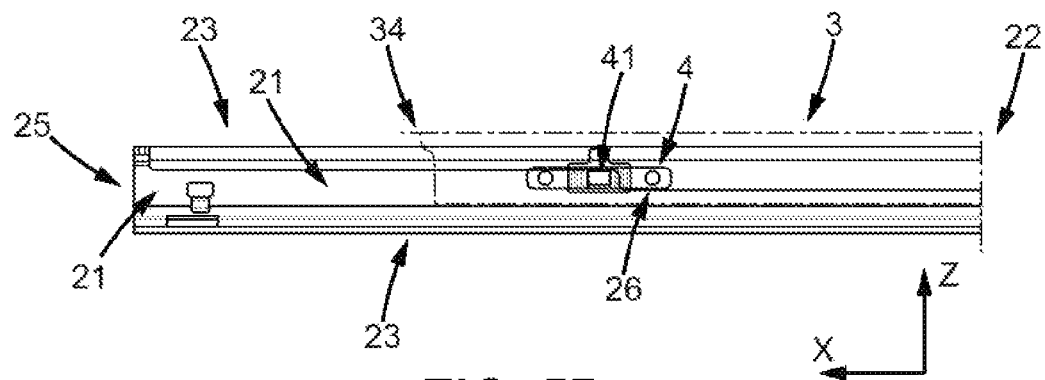
FIG. 5B is a side view of the slide of FIG. 1A, with the male rail in a second position relative to the female rail along the longitudinal direction of the slide.
Figure 5C:
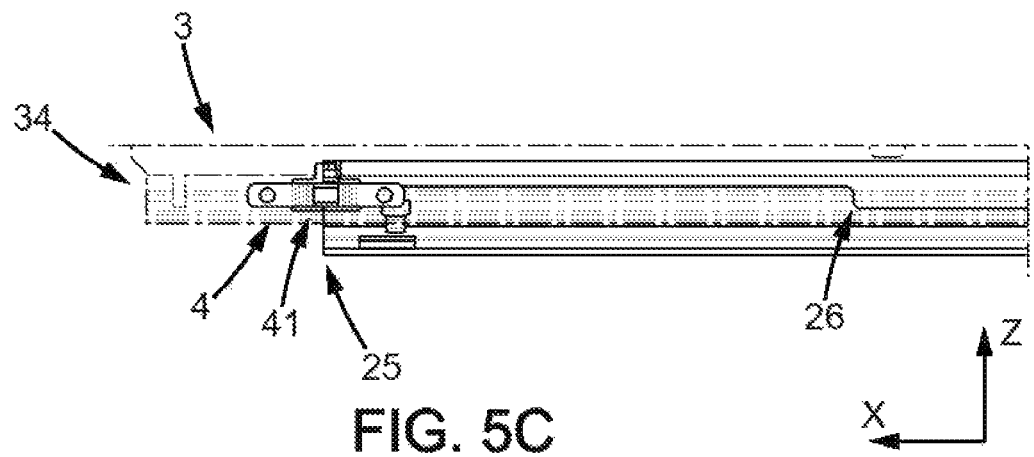
FIG. 5C is a side view of the slide of FIG. 1A, with the male rail in a third position relative to the female rail along the longitudinal direction of the slide.

According to one embodiment, and as is more particularly visible in FIGS. 4 to 5C, the female rail 2 is delimited in the longitudinal direction X of the slide 1 by a first longitudinal end 24 and a second longitudinal end 25, the first longitudinal portion 22 of the female rail 2 extending between the first longitudinal end 24 and an intermediate point 26 positioned between the first longitudinal end 24 and the second longitudinal end 25 in the longitudinal direction X of the slide 1, a second longitudinal portion 23 of the female rail 2 extending between the intermediate point 26 and the second longitudinal end 25 in the longitudinal direction X of the slide 1.

Thus, with such a slide 1, in particular when the position sensor 4 comprises a means for measuring the magnetic field 41 as a function of the position of the male rail 3 on which the position sensor 4 is fixed, with respect to the female rail 2 and therefore to the longitudinal portion 22, 23 of the female rail 2 facing the position sensor 4, the value of the magnetic field measured by the means for measuring the magnetic field 41 varies.

In particular, when the means for measuring the magnetic field 41 is facing the first longitudinal portion 22 of the female rail 2, and therefore facing the through-opening O22, as can be seen in FIG. 5A, the measured magnetic field differs significantly from that measured when it is facing the second longitudinal portion 23, advantageously devoid of an opening as can be seen in FIG. 5B.

Nevertheless, the presence of the metal material of the substantially planar wall 21 of the female rail 2 around the through-opening O22 of the first longitudinal portion 22 will generate a different magnetic field measurement compared to a magnetic field measurement when the means for measuring the magnetic field 41 is offset from the substantially planar wall 21 of the female rail 2 along the longitudinal direction X of the slide 1, and is facing emptiness, as can be seen in FIG. 5C (and also compared to a magnetic field measurement when the means for measuring a magnetic field 41 is facing the second longitudinal portion 23 of the substantially planar wall 21 of the female rail 2).

With such a design of the slide 1, the position sensor 4 does not necessarily continuously measure the displacement of the male rail 3 relative to the female rail 2, but makes it possible to determine that the male rail 3 has passed one or more defined positions of the male rail 3 relative to the female rail 2 along the longitudinal direction X of the slide 1, substantially corresponding to the first longitudinal portion 22, second longitudinal portion 23 of the female rail 2 which are separated by the intermediate point 26, and possibly to a zone beyond the female rail 2 in the longitudinal direction X of the slide 1.

With such a design of the slide 1, and in particular of the female rail 2, it is not necessary to provide an additional element attached to the female rail 2 to modify the magnetic field measurement by the means for measuring the magnetic field 41 in order to reliably determine the position of the male rail 3 relative to the female rail 2 in the longitudinal direction X of the slide 1, unlike the comparative slides, which simplifies the design and reduces the production cost of such a slide 1.

Also, when the position sensor 4 comprises a mechanical switch, the opening O22 can be shaped so as to actuate the mechanical switch when the switch is facing the intermediate point 26, so as to respectively open or close it.

In addition, when the position sensor 4 comprises an optical switch, the optical signal emitted by the switch is not reflected by the substantially planar wall 21 of the female rail 2 when it is facing the opening O22, and is reflected when it is facing the second longitudinal portion 23, so as to modify the open or closed state thereof.

According to one embodiment, the vertical side wall 21 of the female section piece 2 is called the first vertical side wall 21, the female section piece 2 comprising a second vertical side wall 21' substantially parallel to the first vertical side wall 21, the first vertical side wall 21 and the second vertical side wall 21' surrounding the male section 3 in the transverse direction Y of the slide 1.

According to the findings of the inventor, the opening O22 of the first longitudinal portion 22 provided in the first vertical side wall 21 of the female rail 2, in cooperation with the position sensor 4, allows reliably knowing the position of the male rail 3 relative to the female rail 2 in the longitudinal direction X of the slide 1, and without affecting the mechanical strength of the female rail 2, in particular in the event of a crash of the vehicle receiving the slide 1, in particular when the first vertical side wall 21 is intended to be located closer than the second vertical side wall 21' to a central longitudinal axis X1 of the seating portion 11 of a vehicle seat 10 to which the slide 1 is connected, advantageously the male section piece 3 of the slide 1. Indeed, the second vertical side wall 21' is generally connected to a seat belt buckle of the seat 10 comprising the slide 1, and is subjected to greater stresses than the first vertical side wall 21 of the female rail 2 in the event of a crash of the vehicle receiving the seat 10, the latter wall generally not connected to a highly stressed element in the event of a crash of the vehicle.

In particular, when the position sensor 4 comprises a means for measuring the magnetic field 41, the opening O22 of the first longitudinal portion 22 provided in the first vertical side wall 21 of the female rail 2 causes significant modification of the magnetic field measured by the means for measuring the magnetic field 41, when it is located opposite the first longitudinal portion 22, to allow reliably knowing the position of the male rail 3 relative to the female rail 2 in the longitudinal direction X of the slide 1, without affecting the mechanical strength of the female rail 2.

According to one embodiment, and as can be seen in the embodiments of FIGS. 5A to 5C, the male rail 3 is delimited in the longitudinal direction X of the slide 1 by a first longitudinal end 33 and a second longitudinal end 34, the position sensor 4 being fixed to the substantially planar wall 31 of the male rail 3 near the first longitudinal end 33 or the second longitudinal end 34.

Figure 6:
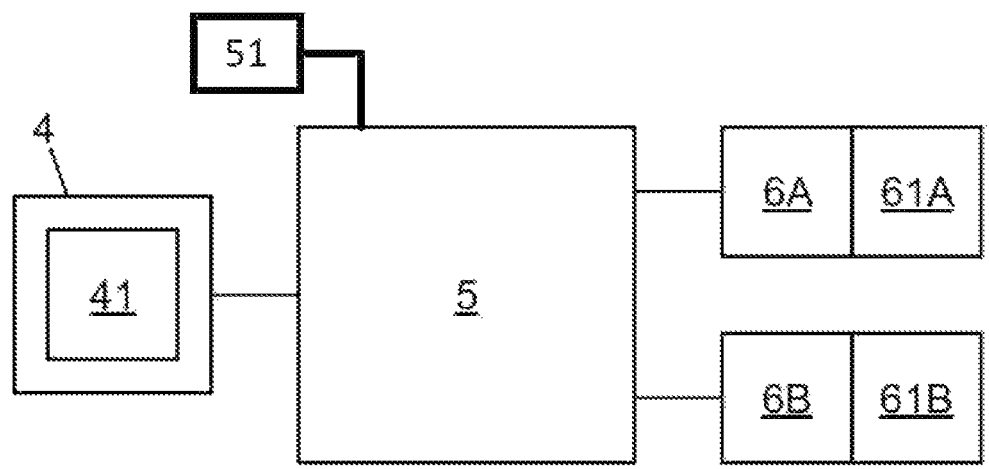
FIG. 6 is a schematic side view of a seat according to one embodiment of the present disclosure.

The present disclosure also relates to an assembly, partially represented in FIG. 6, comprising:
- a slide 1 according to one of the embodiments described above,
- a control unit 5 to which the position sensor 4 of the slide 1 is connected,
- a vehicle crash detection means 51,
- a first retaining means 6A for retaining a vehicle seat occupant, connected to the control unit 5, able to transition:
  from a retracted position, in which the first retaining means 6A is held inside a first housing 61A, to
  a deployed position, in which the first retaining means 6A is deployed out of the first housing 61A, at least partially,
- a second retaining means 6B for retaining a vehicle seat occupant, connected to the control unit 5, able to transition:
  from a retracted position, in which the second retaining means 6B is held inside a second housing 61B, to
  a deployed position, in which the second retaining means 6B is deployed out of the second housing 61B, at least partially.

According to the present disclosure, the second retaining means 6B has a volume in its deployed position that is strictly greater than that of the first retaining means 6A in its deployed position, and the control unit 5 is configured to:
  control the transition of the first retaining means 6A from its retracted position to its deployed position and the holding of the second retaining means 6B in the retracted position, when the position sensor 4 is located opposite the first longitudinal portion 22 of the female rail 2, and when the detection means 51 detects a crash of the vehicle,
  control the transition of the second retaining means 61B from its retracted position to its deployed position, when the position sensor 4 is located opposite the second longitudinal portion 23 of the female rail 2, and the detection means 51 detects a crash of the vehicle.

Such an assembly is provided for cooperating with a vehicle seat 10, generally receiving an occupant in a seated position, and to which is fixed the slide 1 which is also intended to be fixed to the floor of a vehicle, in order to allow the first or second retaining means 6A, 6B to be deployed in the event of a vehicle crash detected by the crash detection means 51 according to the position of the seat 10 relative to the floor of the vehicle, along the longitudinal direction X of the slide 1.

In particular, the first retaining means 6A can be intended to be deployed if the occupant of the seat 10 is small, and therefore the position of the male rail 3 relative to the female rail 2 is such that the position sensor 4 is located opposite the first longitudinal portion 22 of the female rail 2, advantageously corresponding to an advanced position of the seat 10 relative to the vehicle floor, in the longitudinal direction X of the slide 1, as can be seen in FIG. 5A.

Similarly, the second retaining means 6B can be intended to be deployed if the occupant of the seat is large, and therefore the position of the male rail 3 relative to the female rail 2 is such that the position sensor 4 is located opposite the second longitudinal portion 23 of the female rail 2, advantageously corresponding to a rearward position of the seat 10 relative to the vehicle floor, in the longitudinal direction X of the slide 1, as can be seen in FIG. 5B.

Advantageously, the control unit 5 can also be configured to control the transition of the second retaining means 6B from its retracted position to its deployed position, when the position sensor 4 is distanced from the female rail 2 in the longitudinal direction X of the slide 1, and in particular when it is closer to the second longitudinal portion 22 than to the first longitudinal portion 23 in the longitudinal direction X of the slide 1.

Indeed, such a position of the male rail 3 relative to the female rail 2 can also correspond to a rearward position of the seat 10 for a tall user, as can be seen in FIG. 5C.

The first retaining means 6A, 6B may for example be an airbag, intended to transition from its retracted position to its deployed position by being filled with gas. In order to minimize the volume occupied by the assembly, the first retaining means 6A and the second retaining means 6B can form a single airbag comprising at least two chambers capable of receiving gas in order to inflate the airbag to the desired volume and so as to form the first retaining means 6A or the second retaining means 6B.

Advantageously, in order to minimize the volume occupied by the assembly according to the present disclosure, the first housing 61A and the second housing 61B can be merged, the first and the second retaining means 6A, 6B being housed in the same housing in their deployed position.

Figure 7:
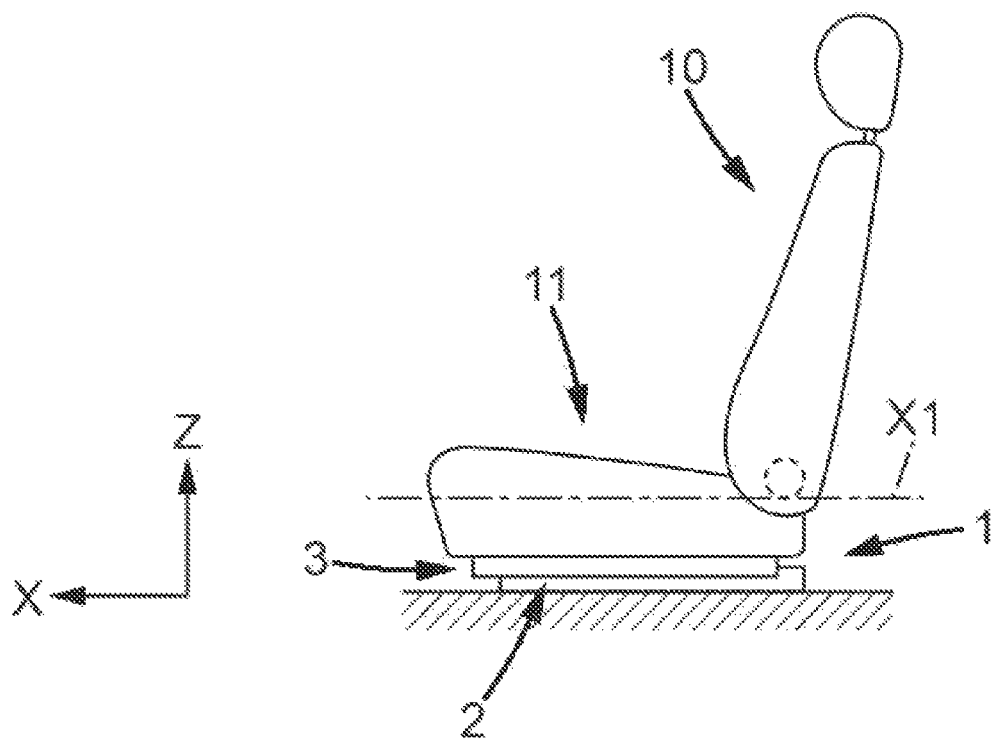
FIG. 7 is a partial schematic view of an assembly according to one embodiment of the present disclosure.

The present disclosure also relates to a seat 10 for a vehicle, and in particular for a motor vehicle, as can be seen in FIG. 7, comprising:
- a slide 1 according to one of the embodiments described above or an assembly according to one of the embodiments described above, and
- a seating portion 11, the male section piece 3 of the slide 1 being connected to the seating portion 11 of the seat 10, the seating portion 11 having a central longitudinal axis X1 passing substantially through the center of the seating portion 11 in the transverse direction Y of the slide 1.

All of the arrangements described above relating to a vehicle seat 10 to which a slide 1 according to the present disclosure or a slide of an assembly according to the present disclosure is attached, apply to the vehicle seat 10 according to the present disclosure.

According to one embodiment, the seat 10 or the assembly comprises a slide 1, as described above, wherein the substantially planar wall 21 of the female rail 2 has a through-opening O22 extending over a first longitudinal portion 22 of the female rail 2 in the longitudinal direction X of the slide 1, and configured so that the position sensor 4 is located opposite the opening O22 when the position sensor 4 is located opposite the first longitudinal portion 22, and wherein the female rail 2 is delimited in the longitudinal direction X of the slide 1 by a first longitudinal end 24 and a second longitudinal end 25, the first longitudinal portion 22 of the female rail 2 extending between the first longitudinal end 24 and an intermediate point 26 positioned between the first longitudinal end 24 and the second longitudinal end 25 in the longitudinal direction X of the slide 1, a second longitudinal portion 23 of the female rail 2 extending between the intermediate point 26 and the second longitudinal end 25 in the longitudinal direction X of the slide 1.

According to such an embodiment, the male rail 3 is delimited in the longitudinal direction X of the slide 1 by a first longitudinal end 33 and a second longitudinal end 34, the position sensor 4 being fixed on the substantially planar wall 31 of the male rail 3 near the second longitudinal end 34.

The first longitudinal end 33 of the male rail 3 can then be positioned at the front of the seat 10 and the second longitudinal end 34 can be positioned at the rear of the seat 10, in the longitudinal direction X of the slide 1.

Similarly, the first longitudinal end 24 of the female rail 2 can then be positioned at the front of the seat 10 and the second longitudinal end 25 of the female rail 2 can be positioned at the rear of the seat 10, as can be seen in FIG. 7.

Thus, and as explained above concerning the assembly according to the present disclosure, the configuration of the slide 1 in which the position sensor 4 is located opposite the first longitudinal portion 22 of the female rail 2, can advantageously correspond to an advanced position of the seat 10 when the seat is receiving a small occupant, while the configuration of the slide 1 in which the position sensor 4 is located opposite the second longitudinal portion 23 of the female rail 2, can advantageously correspond to a rearward position of the seat 10, when the seat is receiving a large occupant.

According to one embodiment, wherein:
- the substantially planar wall 21 of the female rail 2 of the slide 1 is a vertical side wall 21 of the female rail 2,
- the substantially planar wall 31 of the male rail 3 of the slide 1 is a vertical side wall 31 facing the vertical side wall 21 of the female rail 2 in the transverse direction Y of the slide 1, and wherein
- the vertical side wall 21 of the female section piece 2 is called the first vertical side wall 21, the female section piece 2 comprising a second vertical side wall 21' substantially parallel to the first vertical side wall 21, the first vertical side wall 21 and the second vertical side wall 21' surrounding the male section piece 3 in the transverse direction Y of the slide 1,
- the first vertical side wall 21 of the female rail 2 is closer to the central longitudinal axis X1 of the seating portion 11 of the seat 10 in the transverse direction Y of the slide 1 than the second vertical side wall 21' of the female rail 2.

Due to this advantageous arrangement of the present disclosure, and as explained above, the opening O22 of the first longitudinal portion 22, provided in the first vertical side wall 21 of the female rail 2, in cooperation with the position sensor 4 allows reliably knowing the position of the male rail 3 relative to the female rail 2 in the longitudinal direction X of the slide 1, and without compromising the mechanical strength of the female rail 2, in particular in the event of a crash of the vehicle receiving the seat 10 according to the present disclosure and therefore the slide 1.

Indeed, the second vertical side wall 21' is generally connected to a seat belt buckle of the seat 10 comprising the slide 1, and undergoes greater stresses than the first vertical side wall 21 of the female rail 2 in the event of a crash of the vehicle receiving the seat 10, the latter wall generally not being connected to a highly stressed element in the event of a crash of the vehicle.

In particular, when the position sensor 4 comprises a means for measuring the magnetic field 41, the opening O22 of the first longitudinal portion 22 provided in the first vertical side wall 21 of the female rail 2 causes significant modification of the magnetic field measured by the means for measuring the magnetic field 41, when it is located opposite the first longitudinal portion 22, enabling the position of the male rail 3 relative to the female rail 2 to be known reliably in the longitudinal direction X of the slide 1, without compromising the mechanical strength of the female rail 2.

Of course, other embodiments are conceivable to those skilled in the art, without departing from the scope of the present disclosure defined by the claims below.

A comparative slide includes a female rail, and a male rail mounted to slide relative to the female rail in the longitudinal direction of the comparative slide, the female rail surrounding the male rail in the transverse direction of the comparative slide. The comparative slide also has a position sensor configured to determine the position of the female rail relative to the male rail, comprising a substantially L-shaped protuberance provided on an outer side wall of the female rail, projecting outwardly from the female rail, as well as a magnetic field sensor provided on an outer side wall of the male rail, projecting outwardly from the male rail and intended to receive the protuberance internally. The magnetic field or its variation measured by the magnetic field sensor allows knowing the position of the female rail relative to the male rail in the longitudinal direction of the slide, and therefore of the seat intended to be fixed to the floor of a vehicle via the slide, and in particular so as to be able to manage the deployment of a passenger restraint system, for example such as an airbag.

Such a comparative slide has several disadvantages.

First, the comparative design of the position sensor, with the fixed L-shaped protuberance projecting outwardly on the female rail, significantly increases the space occupied by the slide, particularly in its transverse direction.

Also, such a comparative design of the position sensor, in particular with the need for the fixed L-shaped protuberance projecting outwardly on the female rail of the slide, complicates the design of the slide and significantly increases its production cost.

In addition, as the position sensor has elements projecting outwardly from the female rail, there is the risk of damage by other elements of the vehicle to which the slide is fixed, for example such as the feet of a vehicle occupant, and it may no longer be able to function, which can pose a strong threat to the safety of occupants of a vehicle in which a seat is fixed to the floor via the slide.

The present disclosure improves the situation.

The object of the present disclosure is therefore to provide a slide for a vehicle seat, comprising a female rail and a male rail which are mounted to slide relative to each other in a longitudinal direction of the slide, the female rail surrounding the male rail in a transverse direction of the slide, and with a position sensor configured to determine the position of the male rail relative to the female rail that is of simplified design and of reduced footprint and production cost.

Another object of the present disclosure is to provide such a slide which improves safety for the occupants of a vehicle.

Thus, the present disclosure relates to a slide for a vehicle seat, comprising:
  a female rail having at least one substantially planar wall,
  a male rail also having at least one substantially planar wall, mounted to slide relative to the female rail in the longitudinal direction of the slide, the female rail surrounding the male rail in the transverse direction of the slide, with the substantially planar wall of the female rail facing the substantially planar wall of the male rail,
  a position sensor configured to determine the position of the male rail relative to the female rail, at least in the longitudinal direction of the slide.

According to the present disclosure, the position sensor is integral with the substantially planar wall of the male rail and provided between the substantially planar wall of the male rail and the substantially planar wall of the female rail, protruding from the substantially planar wall of the male rail towards the substantially planar wall of the female rail.

The features set forth in the following paragraphs may optionally be implemented. They may be implemented independently of each other or in combination with each other:
  The substantially planar wall of the female rail is a vertical side wall of the female rail, and the substantially planar wall of the male rail is a vertical side wall facing the vertical side wall of the female rail in the transverse direction of the slide, the position sensor being integral with the vertical side wall of the male rail and extending between the vertical side wall of the male rail and the vertical side wall of the female rail in the transverse direction of the slide, protruding from the vertical side wall of the male rail towards the vertical side wall of the female rail;
  The substantially planar wall of the female rail has a through-opening extending over a first longitudinal portion of the female rail in the longitudinal direction of the slide, and configured so that the position sensor is located opposite the opening when the position sensor is located opposite the first longitudinal portion;
  The female rail is delimited in the longitudinal direction of the slide by a first longitudinal end and a second longitudinal end, the first longitudinal portion of the female rail extending between the first longitudinal end and an intermediate point positioned between the first longitudinal end and the second longitudinal end in the longitudinal direction of the slide, a second longitudinal portion of the female rail extending between the intermediate point and the second longitudinal end in the longitudinal direction of the slide;
  The vertical side wall of the female section piece is called the first vertical side wall, the female section piece comprising a second vertical side wall substantially parallel to the first vertical side wall, the first vertical side wall and the second vertical side wall surrounding the male section piece in the transverse direction of the slide;

The male rail is delimited in the longitudinal direction of the slide by a first longitudinal end and a second longitudinal end, the position sensor being fixed on the substantially planar wall of the male rail near the first longitudinal end or the second end longitudinal;

The position sensor comprises a means for measuring the surrounding magnetic field.

The present disclosure also relates to an assembly comprising:
a slide according to the present disclosure,
a control unit to which the position sensor of the slide is connected,
a vehicle crash detection means,
a first retaining means for retaining a vehicle seat occupant, connected to the control unit, able to transition:
from a retracted position, in which the first retaining means is held inside a first housing, to
a deployed position, in which the first retaining means is deployed out of the first housing, at least partially,
a second retaining means for retaining a vehicle seat occupant, connected to the control unit, able to transition:
from a retracted position, in which the second retaining means is held inside a second housing, to
a deployed position, in which the second retaining means is deployed out of the second housing, at least partially.

Advantageously, the second retaining means in its deployed position has a volume strictly greater than that of the first retaining means in its deployed position, and the control unit is configured to:
control the transition of the first retaining means from its retracted position to its deployed position and the holding of the second retaining means in the retracted position, when the position sensor is located opposite the first longitudinal portion of the female rail, and when the detection means detects a crash of the vehicle,
control the transition of the second retaining means from its retracted position to its deployed position, when the position sensor is located opposite the second longitudinal portion of the female rail, and when the detection means detects a crash of the vehicle.

Finally, the present disclosure relates to a vehicle seat comprising:
a slide according to the present disclosure, and
a seating portion, the male section piece of the slide being connected to the seating portion of the seat, the seating portion having a central longitudinal axis passing substantially through the center of the seating portion in the transverse direction of the slide.

According to one embodiment:
the first longitudinal end of the male rail is positioned at the front of the seat and the second longitudinal end is positioned at the rear of the seat in the longitudinal direction of the slide, and the position sensor is fixed on the substantially planar wall of the male rail near the second longitudinal end,
the first longitudinal end of the female rail is positioned at the front of the seat and the second longitudinal end of the female rail is positioned at the rear of the seat in the longitudinal direction of the slide.

According to one embodiment, the first vertical side wall of the female rail is closer to the central longitudinal axis of the seating portion of the seat in the transverse direction of the slide than the second vertical side wall of the female rail.

Slide (1) for a vehicle seat, comprising:
a female rail (2) having at least one substantially planar wall (21),
a male rail (3) also having at least one substantially planar wall (31), mounted to slide relative to the female rail (2), the female rail (2) surrounding the male rail (3) with the substantially planar wall (21) of the female rail (2) facing the substantially planar wall (31) of the male rail (3),
a position sensor (4) integral with the substantially planar wall (31) of the male rail (3) and provided between the substantially planar wall (31) of the male rail (3) and the substantially planar wall (21) of the female rail (2), protruding from the substantially planar wall (31) of the male rail (3) towards the substantially planar wall (21) of the female rail (2).

The following numbered clauses include embodiments that are contemplated and non-limiting:

Clause 1. A slide (1) for a vehicle seat, comprising:
a female rail (2) having at least one substantially planar wall (21),
a male rail (3) also having at least one substantially planar wall (31), mounted to slide relative to the female rail (2) in the longitudinal direction (X) of the slide (1), the female rail (2) surrounding the male rail (3) in the transverse direction (Y) of the slide (1), with the substantially planar wall (21) of the female rail (2) facing the substantially planar wall (31) of the male rail (3),
a position sensor (4) configured to determine the position of the male rail (3) relative to the female rail (2), at least in the longitudinal direction (X) of the slide (1),
the position sensor (4) being integral with the substantially planar wall (31) of the male rail (3) and provided between the substantially planar wall (31) of the male rail (3) and the substantially planar wall (21) of the female rail (2), protruding from the substantially planar wall (31) of the male rail (3) towards the substantially planar wall (21) of the female rail (2).

Clause 2. The slide (1) according to claim 1, wherein:
the substantially planar wall (21) of the female rail (2) is a vertical side wall (21) of the female rail (2),
the substantially planar wall (31) of the male rail (3) is a vertical side wall (31) facing the vertical side wall (21) of the female rail (2) in the transverse direction (Y) of the slide (1),
the position sensor (4) being integral with the vertical side wall (31) of the male rail (3) and extending between the vertical side wall (31) of the male rail (3) and the vertical side wall (21) of the female rail (2) in the transverse direction (Y) of the slide (1), protruding from the vertical side wall (31) of the male rail (3) towards the vertical side wall (21) of the female rail (2).

Clause 3. The slide (1) according to one of claim 1 or 2, wherein the substantially planar wall (21) of the female rail (2) has a through-opening (O22) extending over a first longitudinal portion (22) of the female rail (2) in the longitudinal direction (X) of the slide (1), and configured so that the position sensor (4) is located opposite the opening (O22) when the position sensor (4) is located opposite the first longitudinal portion (22).

Clause 4. The slide (1) according to claim 3, wherein the female rail (2) is delimited in the longitudinal direction (X) of the slide (1) by a first longitudinal end (24) and a second longitudinal end (25), the first longitudinal portion (22) of the female rail (2) extending between the first longitudinal end (24) and an intermediate point (26) positioned between the first longitudinal end (24) and the second longitudinal end (25) in the longitudinal direction (X) of the slide (1), a second longitudinal portion (23) of the female rail (2)

extending between the intermediate point (26) and the second longitudinal end (25) in the longitudinal direction (X) of the slide (1).

Clause 5. The slide (1) according to claim 3 or 4, taken in combination with claim 2, wherein the vertical side wall (21) of the female section piece (2) is called the first vertical side wall (21), the female section piece (2) comprising a second vertical side wall (21') substantially parallel to the first vertical side wall (21), the first vertical side wall (21) and the second vertical side wall (21') surrounding the male section piece (3) in the transverse direction (Y) of the slide (1).

Clause 6. The slide (1) according to one of claims 1 to 5, wherein the male rail (3) is delimited in the longitudinal direction (X) of the slide (1) by a first longitudinal end (33) and a second longitudinal end (34), the position sensor (4) being fixed on the substantially planar wall (31) of the male rail (3) near the first longitudinal end (33) or the second longitudinal end (34).

Clause 7. The slide (1) according to one of claims 1 to 6, wherein the position sensor (4) comprises a means for measuring the surrounding magnetic field (41).

Clause 8. Assembly comprising:
a slide (1) according to claim 4 taken alone or in combination with one of claims 5 to 7,
a control unit (5) to which the position sensor (4) of the slide (1) is connected,
a vehicle crash detection means (51),
a first retaining means (6A) for retaining a vehicle seat occupant, connected to the control unit (5), able to transition:
from a retracted position, in which the first retaining means (6A) is held inside a first housing (61A), to
a deployed position, in which the first retaining means (6A) is deployed out of the first housing (61A), at least partially,
a second retaining means (6B) for retaining a vehicle seat occupant, connected to the control unit (5), able to transition:
from a retracted position, in which the second retaining means (6B) is held inside a second housing (61B), to
a deployed position, in which the second retaining means (6B) is deployed out of the second housing (61B), at least partially,
wherein the second retaining means (6B) in its deployed position has a volume strictly greater than that of the first retaining means (6A) in its deployed position, and
wherein the control unit (5) is configured to:
control the transition of the first retaining means (6A) from its retracted position to its deployed position and the holding of the second retaining means (6B) in the retracted position, when the position sensor (4) is located opposite the first longitudinal portion (22) of the female rail (2), and when the detection means (51) detects a crash of the vehicle,
control the transition of the second retaining means (61B) from its retracted position to its deployed position, when the position sensor (4) is located opposite the second longitudinal portion (23) of the female rail (2), and when the detection means (51) detects a crash of the vehicle.

Clause 9. Vehicle seat (10) comprising:
a slide (1) according to one of claims 1 to 6 or an assembly according to claim 7, and
a seating portion (11), the male section piece (3) of the slide (1) being connected to the seating portion (11) of the seat (10), the seating portion (11) having a central longitudinal axis (X1) passing substantially through the center of the seating portion (11) in the transverse direction (Y) of the slide (1).

Clause 10. Seat (10) according to claim 9 comprising a slide according to claims 4 and 6, taken alone or in combination with claim 5, or an assembly according to claim 7 comprising a slide according to claims 4 and 6, taken alone or in combination with claim 5, wherein:
the first longitudinal end (33) of the male rail (3) is positioned at the front of the seat (10) and the second longitudinal end (34) is positioned at the rear of the seat (10) in the longitudinal direction (X) of the slide (1), and the position sensor (4) is fixed on the substantially planar wall (31) of the male rail (3) near the second longitudinal end (34),
the first longitudinal end (24) of the female rail (2) is positioned at the front of the seat (10) and the second longitudinal end (25) of the female rail (2) is positioned at the rear of the seat (10) in the longitudinal direction (X) of the slide (1).

Clause 11. Seat (10) according to claim 8 or 9 comprising a slide (1) according to claim 5, taken alone or in combination with claim 6, or an assembly according to claim 7 comprising a slide (1) according to claim 5, taken alone or in combination with claim 6, wherein the first vertical side wall (21) of the female rail (2) is closer to the central longitudinal axis (X1) of the seating portion (2) of the seat (10) in the transverse direction (Y) of the slide (1) than the second vertical side wall (21') of the female rail (2).

The invention claimed is:

1. A slide for a vehicle seat, comprising:
a female rail having at least one substantially planar wall,
a male rail also having at least one substantially planar wall, mounted to slide relative to the female rail in the longitudinal direction of the slide, the female rail surrounding the male rail in the transverse direction of the slide, with the substantially planar wall of the female rail facing the substantially planar wall of the male rail,
a position sensor configured to determine the position of the male rail relative to the female rail, at least in the longitudinal direction of the slide, the position sensor being integral with the substantially planar wall of the male rail and provided between the substantially planar wall of the male rail and the substantially planar wall of the female rail, protruding from the substantially planar wall of the male rail towards the substantially planar wall of the female rail,
wherein the substantially planar wall of the female rail has a through-opening extending over a first longitudinal portion of the female rail in the longitudinal direction of the slide, and configured so that the position sensor is located opposite the opening when the position sensor is located opposite the first longitudinal portion,
wherein the female rail is delimited in the longitudinal direction of the slide by a first longitudinal end and a second longitudinal end, the first longitudinal portion of the female rail extending from the first longitudinal end to an intermediate point positioned between the first longitudinal end and the second longitudinal end in the longitudinal direction of the slide, a second longitudinal portion of the female rail extending between the intermediate point and the second longitudinal end in the longitudinal direction of the slide, and
wherein the position sensor comprises a means for measuring the surrounding magnetic field, configured so that when the means for measuring the magnetic field is facing the first longitudinal portion of the female rail and the through-opening, the measured magnetic field differs from that measured when the means for measuring the magnetic field is facing the second longitudinal portion that is devoid of an opening.

2. The slide of claim 1, wherein the substantially planar wall of the female rail is a vertical side wall of the female rail, the substantially planar wall of the male rail is a vertical side wall facing the vertical side wall of the female rail in the transverse direction of the slide, the position sensor being integral with the vertical side wall of the male rail and extending between the vertical side wall of the male rail and the vertical side wall of the female rail in the transverse direction of the slide, protruding from the vertical side wall of the male rail towards the vertical side wall of the female rail.

3. The slide of claim 1, wherein the substantially planar wall of the female rail is a vertical side wall of the female rail, the substantially planar wall of the male rail is a vertical side wall facing the vertical side wall of the female rail in the transverse direction of the slide, the position sensor being integral with the vertical side wall of the male rail and extending between the vertical side wall of the male rail and the vertical side wall of the female rail in the transverse direction of the slide, protruding from the vertical side wall of the male rail towards the vertical side wall of the female rail,
wherein the vertical side wall of the female rail is called the first vertical side wall, the female rail comprising a second vertical side wall substantially parallel to the first vertical side wall, the first vertical side wall and the second vertical side wall surrounding the male rail in the transverse direction of the slide.

4. The slide of claim 1, wherein the male rail is delimited in the longitudinal direction of the slide by a first longitudinal end and a second longitudinal end, the position sensor being fixed on the substantially planar wall of the male rail near the first longitudinal end or the second longitudinal end.

5. An assembly comprising:
a slide according to claim 1,
a control unit to which the position sensor of the slide is connected,
a vehicle crash detection means,
a first retaining means for retaining a vehicle seat occupant, connected to the control unit, able to transition:
from a retracted position, in which the first retaining means is held inside a first housing, to
a deployed position, in which the first retaining means is deployed out of the first housing, at least partially,
a second retaining means for retaining a vehicle seat occupant, connected to the control unit, able to transition:
from a retracted position, in which the second retaining means is held inside a second housing, to
a deployed position, in which the second retaining means is deployed out of the second housing, at least partially,
wherein the second retaining means in its deployed position has a volume strictly greater than that of the first retaining means in its deployed position,
and wherein the control unit is configured to:
control the transition of the first retaining means from its retracted position to its deployed position and the holding of the second retaining means in the retracted position, when the position sensor is located opposite the first longitudinal portion of the female rail, and when the detection means detects a crash of the vehicle,
control the transition of the second retaining means from its retracted position to its deployed position, when the position sensor is located opposite the second longitudinal portion of the female rail, and when the detection means detects a crash of the vehicle.

6. A vehicle seat comprising:
a slide according to claim 1, and
a seating portion, the male rail of the slide being connected to the seating portion of the seat, the seating portion having a central longitudinal axis passing substantially through the center of the seating portion in the transverse direction of the slide.

7. A vehicle seat comprising:
a slide according to claim 3, and
a seating portion, the male rail of the slide being connected to the seating portion of the seat, the seating portion having a central longitudinal axis passing substantially through the center of the seating portion in the transverse direction of the slide,
wherein the male rail is delimited in the longitudinal direction of the slide by a first longitudinal end and a second longitudinal end, the position sensor being fixed on the substantially planar wall of the male rail near the first longitudinal end or the second longitudinal end,
wherein the first longitudinal end of the male rail is positioned at the front of the seat and the second longitudinal end is positioned at the rear of the seat in the longitudinal direction of the slide, and the position sensor is fixed on the substantially planar wall of the male rail near the second longitudinal end,
the first longitudinal end of the female rail is positioned at the front of the seat and the second longitudinal end of the female rail is positioned at the rear of the seat in the longitudinal direction of the slide.

8. The vehicle seat of claim 7, wherein the first vertical side wall of the female rail is closer to the central longitudinal axis of the seating portion of the seat in the transverse direction of the slide than the second vertical side wall of the female rail.

* * * * *